US006795839B2

(12) United States Patent
Karim et al.

(10) Patent No.: US 6,795,839 B2
(45) Date of Patent: Sep. 21, 2004

(54) METHOD AND DEVICE FOR COMPUTING THE NUMBER OF BITS SET TO ONE IN AN ARBITRARY LENGTH WORD

(75) Inventors: Faraydon O. Karim, San Diego, CA (US); Alain Mellan, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 565 days.

(21) Appl. No.: 09/727,135

(22) Filed: Nov. 30, 2000

(65) Prior Publication Data

US 2002/0095450 A1 Jul. 18, 2002

(51) Int. Cl.[7] .............................................. G06F 7/00
(52) U.S. Cl. ...................................................... 708/210
(58) Field of Search ........................................ 708/210

(56) References Cited

U.S. PATENT DOCUMENTS

| | | | | |
|---|---|---|---|---|
| 4,989,168 A | * | 1/1991 | Kuroda et al. | 708/210 |
| 5,541,865 A | * | 7/1996 | Ashkenazi | 708/210 |
| 5,717,616 A | * | 2/1998 | Morris | 708/210 |
| 6,070,237 A | * | 5/2000 | Peleg et al. | 712/210 |

* cited by examiner

Primary Examiner—Tan V. Mai
(74) Attorney, Agent, or Firm—Stephen Bongini; Lisa K. Jorgenson

(57) ABSTRACT

A method and a bit counting device (100) count bits set to one in a data word of arbitrary size. The bit counting device (100) includes a first data register (110) for storing a data word, an offset register (112) for storing an offset value, a second data register (120), and a one-cycle shifter (114), electrically connected to the first data register (110), to the second data register (120), and to the offset register (112), for shifting the data word by a value stored in the offset register (112) and storing the shifted data word in the second data register (120). The device 100 also includes a third data register (124) and at least one carry save adder (CSA) device (122) organized in a tree structure, and electrically connected to the second data register (120) and to the third data register (124), for counting the number of bits set to one in the data word stored in the second data register (120) and storing in the third data register (124) a value representing the count of bits set to one in the data word.

20 Claims, 3 Drawing Sheets

US 6,795,839 B2

METHOD AND DEVICE FOR COMPUTING THE NUMBER OF BITS SET TO ONE IN AN ARBITRARY LENGTH WORD

BACKGROUND OF THE INVENTION

1. Field of the Invention

This invention relates in general to digital computing and communication systems, and more particularly to a method for counting the number of ones in a word such as for processing communication packets of information.

2. Description of Related Art

Modern computing systems typically operate using a binary counting system where numbers are represented by a string of ones and/or zeros. Communication systems, such as used in networks, the Internet, and wireless communication, to name just a few, process information that is typically organized as data packets. Devices in a communication system, such as network routers, repeaters, and relay stations, normally must quickly analyze received data packets to classify the data packets to determine further processing requirements and a further destination to send the data packets. This packet classification process is often a complex task that has to be performed at nearly the speed of the communication data packets to maintain a throughput in a communication system. In a very high speed communication system, for example such as the Internet, the data packets may be processed at up to 30 million packets per second. A bit rate of 10 gigabits per second is not uncommon in processing data packets in such a network.

Accordingly, it is imperative that any operation on the bits of any data packet in such a high speed communication system must be very fast and efficient to keep up with the communication bit rate for such data packets. One common operation comprises bit counting. That is, for example, as part of classifying data packets a computing system commonly has to count bits in a data packet. The speed of bit counting must be kept to nearly the bit rate of the communication of the data packets to minimize the impact of the counting operation on the speed of communication of the data packets across the network.

A typical software based implementation for counting bits may include nested loops of software that include shifting data words in registers, adding registers, testing registers, and branch instructions. For a given 32 bit word length, for example, the total number of processor cycles may approach a multiple of three (3) times the number of bits in the word. For example, for a 32 bit word the counting may require up to three (3) times thirty-two (32) processor cycles. This is a significant time delay that in many high speed communication systems, such as for an IP router, would be unacceptable.

Thus, there is a need to overcome the disadvantages of the prior art, such as discussed above, and in particular to improve the processing speed of bit counting circuits in computing systems such as required by high speed communication of data packets.

DETAILED DESCRIPTION OF THE PREFERRED EMBODIMENTS

The present invention offers significant advantages over the prior art. In prior art computing systems, conventional software implementations for counting bits require as much as 96 processor cycles to arrive at a desired result. This can impose unacceptable delays while processing high speed data packets in a communication system, such as for an IP router in the Internet. The new and novel circuit device according to a preferred embodiment of the present invention, as will be discussed in detail below, provides significantly improved high speed performance for computing systems incorporating the present invention. The present invention provides a new and novel bit counting device that facilitates an implementation that utilizes a single extended computer instruction to count bits in an arbitrary length word. This can accomplish the total count of bits in very few processor cycles. In the example presented below the total count of bits in a 32 bit word is accomplished in just two processor cycles. This is a significant advantage of the present invention that is not available in known prior art computing systems.

Figure 1:
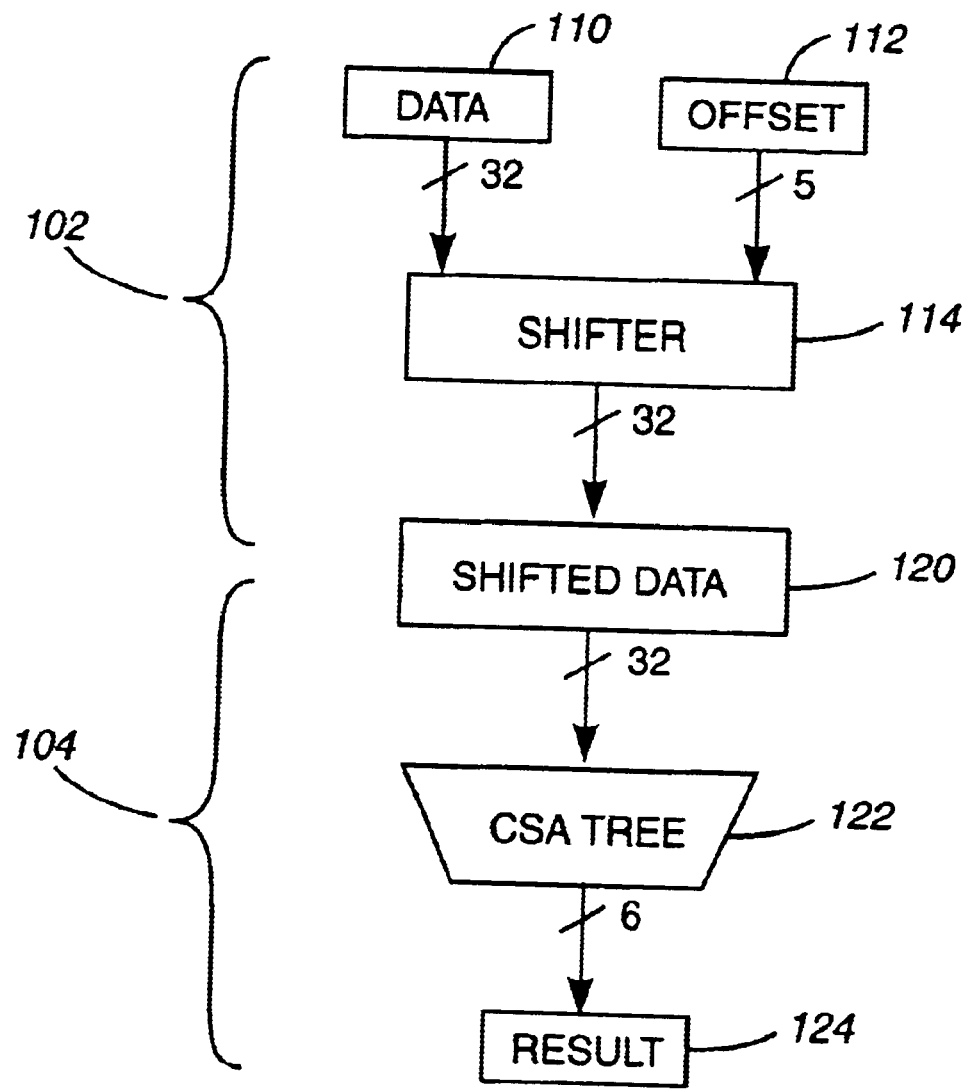
FIG. 1 is a circuit block diagram illustrating an exemplary counting circuit, in accordance with a preferred embodiment of the present invention.

Referring to FIG. 1, a bit counting device 100 is shown according to a preferred embodiment of the present invention. The exemplary bit counting device 100 allows bit counting to be performed in two clock cycles. Although this example is illustrated with a 32 bit wide word, in view of the discussion herein, it should be obvious to those of ordinary skill in the art that the bit counting device 100 can be scaled to count bits for any suitable word size.

The current example utilizes 3-by-2 Carry-Save-Adder (CSA) devices in a tree configuration 122 as will be discussed in more detail below. However, alternative fast hardware implementations may benefit from using different CSA sizes as should be obvious to those of ordinary skill in the art in view of the discussion below. A 3-by-2 CSA device comprises logic circuits that, in response to receiving three input bits, provide two output bits according to the following truth table.

Truth Table For a 3-by-2 CSA

| Inputs => Outputs |
| --- |
| 000 => 00 |
| 001 => 01 |
| 010 => 01 |
| 011 => 10 |
| 100 => 01 |
| 101 => 10 |
| 111 => 11 |

A CSA can be used as a counter of bits. The CSA's output is effectively the binary encoding of the number of bits set to one in the 3-bit input. The output functions based on three input bits, labeled a, b, and c, as as follows.

$o = !a.!b.c + !a.b.!c + a.!b.!c + a.b.c$ $c = !a.b.c + a.!b.c + a.b.!c + a.b.c$

The output functions are easily implemented using NOR gates and NAND gates in a manner well know to those of ordinary skill in the art, in view of the discussion above.

The bit counting device 100, in this example, is organized into two parts. Each part operates in one processor cycle. The first part 102 of the device 100 is in charge of shifting an initial word to the right by the selected number of off-set bits. The second part 104 of the device 100 counts the number of bits in the word that have a value of one.

The purpose of the initial shift to the right is to count the number of bits with a value of one in a desired field of bits in the word. This initial shift therefore is only optional and can be avoided in computing systems that do not necessarily desire to shift the word by a particular offset number of bits. In this example, as the number of selected off-set bits are shifted to the right, the same number of bits with the value of zero are shifted in through the leftmost side of the word.

A data register 110 contains a 32-bit word. An offset register 112 contains a 5-bit value for offset shifting to the right the 32-bit word as discussed above. A one-cycle shifter 114 is electrically coupled to the data register 10 and to the offset register 112. The one-cycle shifter 114 has two inputs: the 32-bit word to shift and the 5-bit input representing the number of bits by which to shift the word to the right. This one-cycle shifter 114 comprises a combinational block that is best described with the following logic equations.
Notation:
The word to be shifted is represented by w[31] ... w[0]
   The result is r[31] ... r[0]
   Shift amount is s[4] ... s[0]
Logical Operations:
   !s[n] represents "not s[n]"
   a.b represents "a and b"
   a+b is "a or b"
We will show a shift right in 3 stages, by grouping s[4] and s[3], then s[2] and s[1], then s[0].
If s[0]=0, nothing gets shifted. If s[0]=1, the shift amount is 1, and then: stage1[n]=w[n+1].
Thus, the equation of the first stage is:

$$stage1[n]=w[n+1].s[0]+w[n].!s[0]$$

We can easily scale this for bits s[2] and s[1]. If s[2]=1, the shift amount is 4. if s[1]=1, the shift amount is 2. For the second stage, the equation is then:

$$stage2[n]=!s[2].!s[1].stage1[n]+!s[2].s[1].stage1[n+2]+s[2].!s[1]\\.stage1[n+4]+s[2].s[1].stage1[n+6]$$

And the result is computed as follow:

$$r[n]=!s[4].!s[3].stage1[n]+!s[4].s[3].stage1[n+8]+s[4].!s[3].stage1[n+16]+s[4].s[3].stage1[n+24]$$

After the one-cycle shifter 114 shifts the data word, the resulting 32 bit word is stored in the shifted data register 120. Now, part two 104 of the bit counting device 100 will count the number of bits set to one in the word contained in the shifted data register 120.

The second part 104 of the bit counting device 104 comprises the shifted data register 120, the CSA tree 122, and a result register 124 that contains a resulting value of the total number of bits with a value of one in the 32-bit word. The CSA tree 122 comprises a plurality of CSA devices that are arranged in a tree structure. See FIG. 2 for an example of a CSA tree 122, using 3-by-2 Carry Save Adders, to compute the number of one bits in a 32-bit word. The result register 124, in this example, is a 5-bit register that can take a value from zero to thirty two, corresponding to the number of bits set to one in the shifted data register 120.

Figure 2:
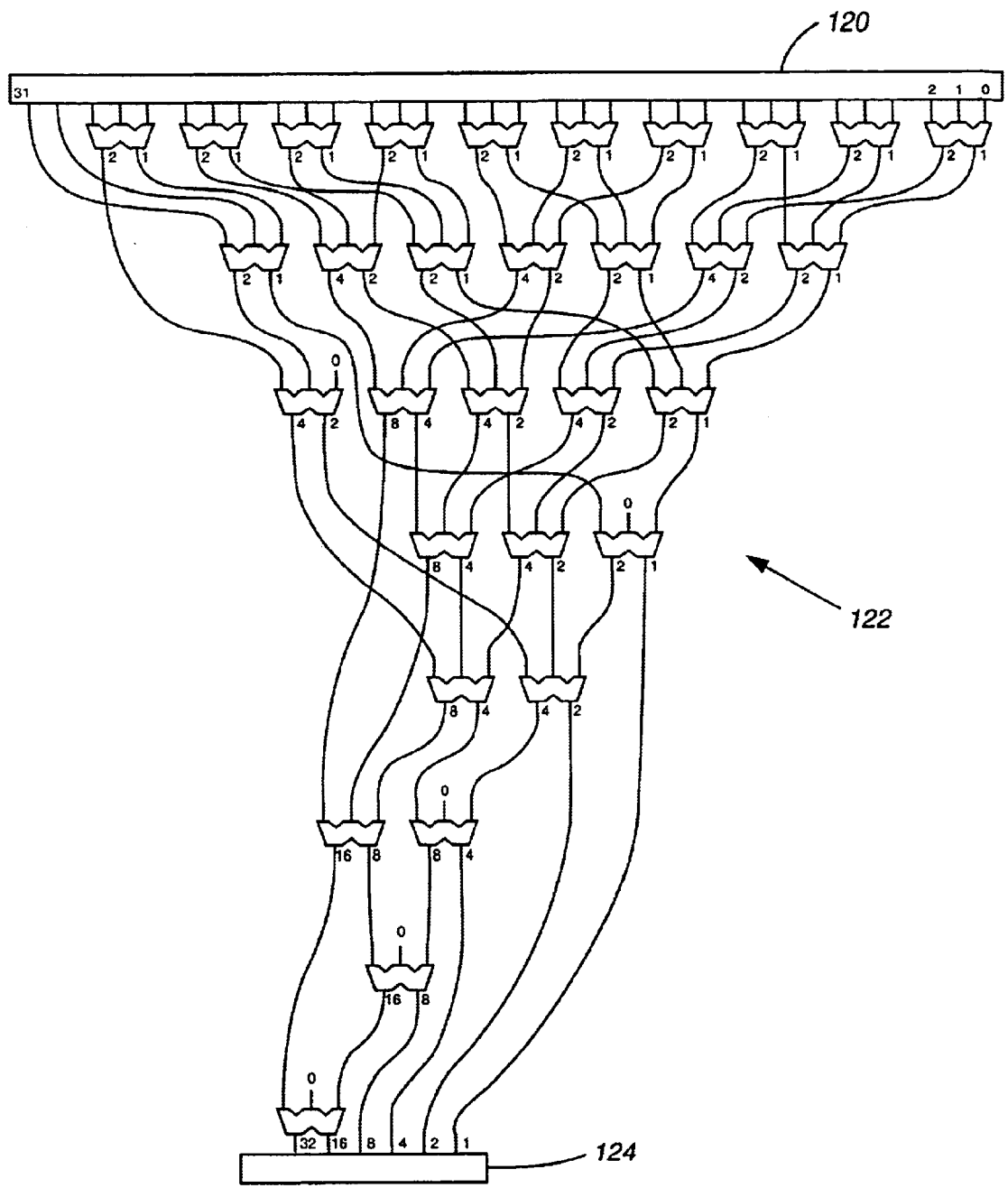
FIG. 2 is a circuit block diagram showing a more detailed view of a portion of the exemplary counting circuit of FIG. 1, according to a preferred embodiment of the present invention.

The CSA tree 122, as shown in FIG. 2, will be discussed in more detail below. The numbers on the outputs of each CSA represent the weights of the output bits. The numbers on the outputs of each CSA, in this example, can be weights of 1, 2, 4, 8, 16, and 32, as shown in FIG. 2. A bit can take on a value of 1 or 0. If a bit has a weight of 1, it means it represents a decimal value of 1 if set to 1, and zero otherwise. For a weight of 2, a bit represents a decimal value of 2 if set to 1, and zero otherwise. For a weight of 4, a bit represents a decimal value of 4 if set to 1, and zero otherwise. This scheme goes on, in this example, until reaching a weight of 32.

A CSA, as discussed above, can be used as a counter of input bits. The two output bits of a 3-by-2 CSA, according to this example, are effectively the binary encoding of the number of bits set to one in the 3-bit input. A zero on the input of a CSA indicates that the input pin receives a zero value all of the time.

Say, for example, that a 3-by-2 CSA is counting the bits that are set to one in a 3-bit word. The result can be 0, 1, 2 or 3. In binary, two bits can represent all the possible output values. Now, say that an exemplary 3-by-2 CSA tree is counting the bits that are set to one in a six-bit word. The CSA tree starts by counting in two separate sets of 3 bits, that is using two 3-by-2 CSAs in a tree arrangement. For each 3-by-2 CSA, the result can be 0, 1, 2 or 3. On each of the two 3-by-2 CSAs, we have bits of weight 1 and 2. Now we need to add those two results. Bits of weight one get added together, yielding a result on 2 bits, using a CSA again. Then bits of weight 2 are added together, yielding a result on two bits. Each bit of weight 2 represents 0 or 2 in decimal. When a CSA adds them, then the result can be 4 (decimal). We would need a bit of weight 4 to represent the result.

The process of creating a CSA tree can be extended beyond the immediate example discussed above to create a number of levels in a CSA tree as necessary to count the number of bits in a desired word length. For example, as shown in FIG. 2, the CSA tree 122 counts the number of one bits in the 32-bit word in the shifted data register 120 by utilizing 31 CSA devices organized in a tree structure to provide a 5-bit result in the result register 124. The CSA tree 122 indicates the weight of the output bits of every CSA device. In combining CSA devices in a tree structure note that outputs of common weight are routed inputs of a CSA device for adding the particular weight. So, for example, the first three CSA devices coupled to the lower bits of the 32-bit word have outputs weighted as "one" and "two". The three "one" outputs are routed to the next level CSA device for summing "ones". The three "two" outputs are routed to the next level CSA device for summing "twos". The method of arranging the CSA tree continues by assigning outputs of certain weight to inputs of a CSA device for summing the particular weighted inputs. The general structure and function of a CSA tree is well known to those of ordinary skill in the art. For example, a CSA tree arrangement is sometimes also known as a Wallace tree. See, for example, the publication by C. S. Wallace, entitled "A Suggestion for a Fast Multiplier", IEEE Trans. on Electronic Computers, February 1964, pp. 14–17.

Figure 3:
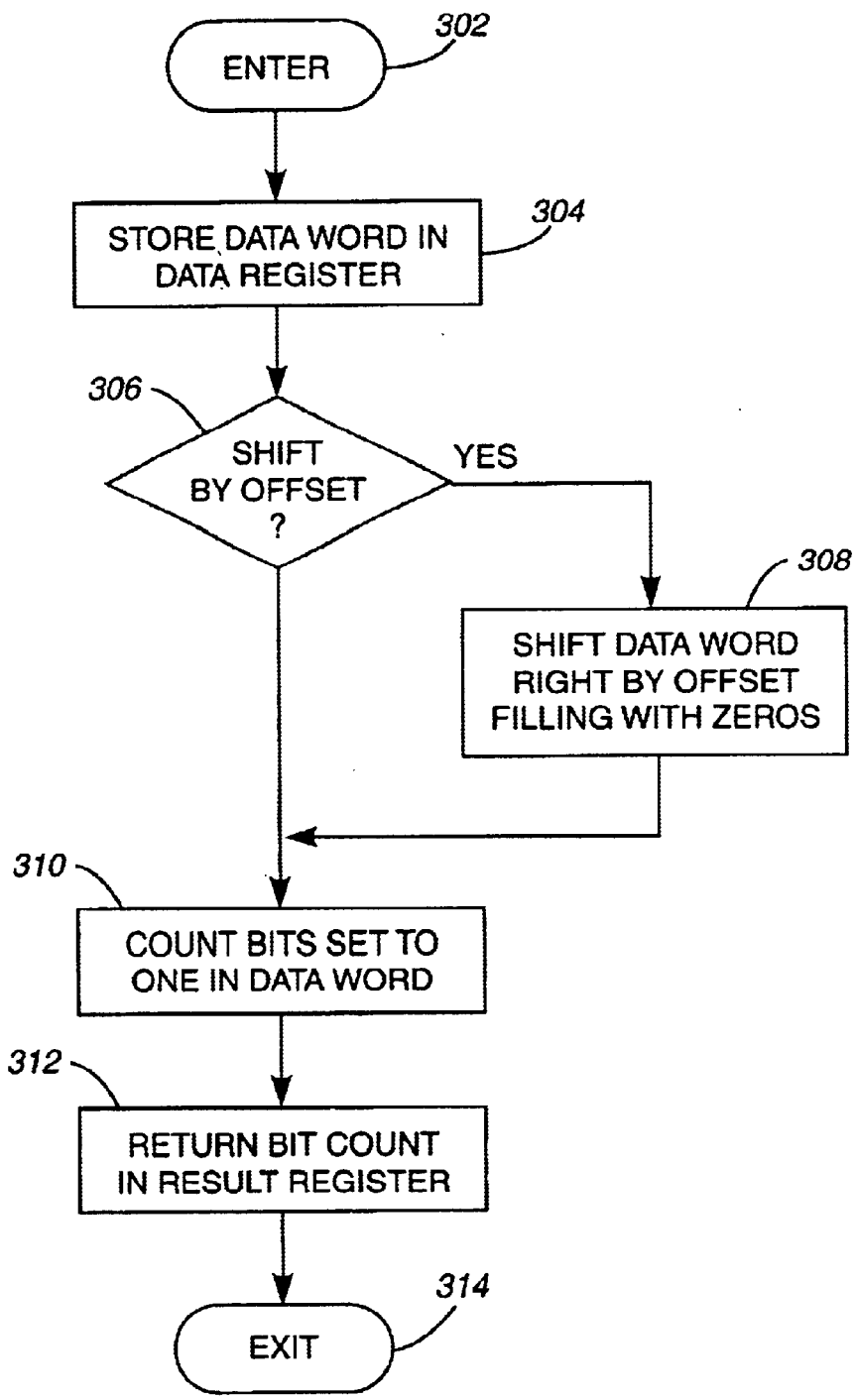
FIG. 3 is a flow diagram illustrating an operational sequence for the counting circuit of FIG. 1, in accordance with a preferred embodiment of the present invention.

FIG. 3 illustrates an exemplary process 300 followed by a computing device that includes a preferred embodiment of the present invention for counting bits with a value of one in a data word. First, at step 302, the computing device enters a routine 300 for counting bits set to one in a data word stored, at step 304, in a data register 120. If the process calls for shifting right the data word, at step 306, then the process continues, at step 308, to shift right the data word by a number of bits as requested by a predefined offset value in the offset register 112. The resulting shifted data word is stored in the shifted data register 120. Alternatively, if no shifting is required, the data word is stored in the shifted data register 120 with no shift being applied to the data word. A shifted data word would be filled from the left side of the shifted data register by zero value bits for the total number of bits that were shifted right in the data word as indicated by the offset value in the offset register 112.

Then, at step 310, the computing device counts the bits set to one in the data word stored in the shifted data register 120. According to the preferred embodiment of the present invention, this step can be performed in a single processor cycle. This is a significant advantage of the present invention. It is particularly useful for high speed computing systems, such as for processing data packets in a high speed communication network. For example, an IP router on the Internet would significantly benefit from including the preferred embodiment of the present invention to handle high speed classification of data packets being routed through the IP router. Lastly, at steps 312 and 314, the process returns in the result register 124 a total bit count of the bits set to one in the data word stored in the shifted data register 120. Note that the term register is used here only for the example where the processor in a computing system would likely benefit from fast coupling to a memory device, such as a register, for use in computing the bit count operation. However, any suitable memory device would be likewise capable of storing the information for use in the bit count operation depending on particular applications, as should become obvious to those of ordinary skill in the art in view of the discussion above. Hence, the term register should be broadly defined to include all forms of memory devices that would be suitable for use in the bit count operation in accordance with the present invention.

A new exemplary instruction for a processor to operate with the bit count device 100, according to a preferred embodiment of the present invention, is provided below:

sshcnt RT, RA, RO where RA is a 32 bit register, RT is a target register, and RO is a register containing an offset value. The shift-and-count instruction above can be performed in one instruction and using only two processor cycles. This instruction can be easily implemented in a pipeline architecture.

As discussed above, the preferred embodiments of the present invention provide a very fast and efficient mechanism for counting bits in a data word. Preferably, the bit count operation is performed in one instruction and only within two clock cycles. This method does not involve any costly branch instruction, and, as discussed above, it can be easily implemented within a pipeline architecture for a processor. The very fast bit count is particularly useful for high speed computing systems and high speed communication systems, where bit counting as a basic system operation must be regularly performed at the maximum speed possibly. In communication systems where data packets are being classified while being repeated across a network, any significant delays in counting bits to classify data packets would detrimentally impact the commercial viability of such communication systems. To maintain a communication throughput all bit counting operations should be preferably performed at nearly the speed of the bit rate of delivering data packets. The preferred embodiments of the present invention, as discussed above, allow such computing systems to meet the stringent constraints for high speed performance demanded by such applications as classification of data packets being delivered across a high speed communication network.

Although specific embodiments of the invention have been disclosed, those having ordinary skill in the art will understand that changes can be made to the specific embodiments without departing from the spirit and scope of the invention. Additionally, many modifications may be made to adapt a particular situation to the teachings of the present invention without departing from the central inventive concepts described herein. Furthermore, an embodiment of the present invention may not include all of the features described above. The scope of the invention is not to be restricted, therefore, to the specific embodiments, and it is intended that the appended claims cover any and all such applications, modifications, and embodiments within the scope of the present invention.

What is claimed is:

1. A bit counting device comprising:

a first data register for storing a data word;

an offset register for storing an offset value;

a second data register;

a one-cycle shifter, electrically coupled to the first data register, to the second data register, and to the offset register, for shifting the data word by a value stored in the offset register and storing the shifted data word in the second data register;

a third data register; and at least one carry save adder (CSA) device, electrically coupled to the second data register and to the third data register, for counting the number of bits set to one in the data word stored in the second data register and storing in the third data register a value representing the count of bits set to one in the data word.

2. The bit counting device of claim 1, wherein the at least one CSA device counts the number of bits set to one in the data word stored in the second data register within a processor cycle.

3. The bit counting device of claim 1, wherein the at least one CSA device comprises a plurality of CSA devices organized in a tree structure to count the number of bits set to one in the data word stored in the second data register and to store in the third data register the value representing the count of bits set to one in the data word.

4. The bit counting device of claim 3, wherein the plurality of CSA devices organized in a tree structure count the number of bits set to one in the data word stored in the second data register within a processor cycle.

5. A computing device comprising:

a first data memory device for storing a data word;

an offset memory device for storing an offset value;

a second data memory device;

a one-cycle shifter, electrically coupled to the first data memory device, to the second data memory device, and to the offset memory device, for shifting the data word by a value stored in the offset memory device and storing the shifted data word in the second data memory device;

a third data memory device; and at least one carry save adder (CSA) device, electrically coupled to the second data memory device and to the third data memory device, for counting the number of bits set to one in the data word stored in the second data memory device and storing in the third data memory device a value representing the count of bits set to one in the data word.

6. A computing device comprising:

a first data register for storing a data word;

a second data register;

at least one carry save adder (CSA) device, electrically coupled to the first data register and to the second data register, for counting the number of bits set to one in the data word stored in the first data register and storing in the second data register a value representing the count of bits set to one in the data word;

a third data register for storing a data word;

an offset register for storing an offset value; and a one-cycle shifter, electrically coupled to the first data register, to the third data register, and to the offset register, for shifting the data word stored in the third data register by a value stored in the offset register and storing the shifted data word in the first data register, and for counting the number of bits set to one in the shifted data word stored in the first data register.

7. The computing device of claim 6, wherein the at least one CSA device counts the number of bits set to one in the data word stored in the first data register within a processor cycle.

8. The computing device of claim 6, wherein the at least one CSA device comprises a plurality of CSA devices organized in a tree structure to count the number of bits set to one in the data word stored in the first data register and to store in the second data register the value representing the count of bits set to one in the data word.

9. The computing device of claim 8, wherein the plurality of CSA devices organized in a tree structure count the number of bits set to one in the data word stored in the first data register within a processor cycle.

10. The computing device of claim 6, wherein the one-cycle shifter shifts right the data word stored in the third data register by the number of bits indicated by the value stored in the offset register and shifts in from the left side of the data word bits with value of zero by the number of bits indicated by the value stored in the offset register, the shifted data word being stored in the first data register.

11. A method in a computing system comprising the steps of:

storing a data word;

shifting the data word by a predefined number of offset bits;

counting the number of bits set to one in the stored shifted data word; and storing a value representing the counted number of bits set to one in the stored shifted data word.

12. A method in a computing system comprising the steps of:

storing a data word;

counting the number of bits set to one in the stored data word within one processor cycle;

storing a value representing the counted number of bits set to one in the data word; and shifting the data word by a predefined number of offset bits, and wherein the counting step counts the number of bits set to one in the shifted data word.

13. The method of claim 12, wherein the counting step is performed using a carry-save-adder operation.

14. The method of claim 12, wherein the shifting step shifts right the data word by the predefined number of offset bits, and further comprising the step of:

shifting in bits with a value of zero from leftmost side of data word by the predefined number of offset bits.

15. A communication system comprising:

a communication network; and a data packet router, communicatively coupled to the communication network, for routing data words in data packets across the communication network, the data packet router comprising:

a first data register for storing a data word;

an offset register for storing an offset value;

a second data register;

a one-cycle shifter, electrically coupled to the first data register, to the second data register, and to the offset register, for shifting the data word by a value stored in the offset register and storing the shifted data word in the second data register, a third data register; and at least one carry save adder (CSA) device, electrically coupled to the second data register and to the third data register, for counting the number of bits set to one in the data word stored in the second data register and storing in the third data register a value representing the count of bits set to one in the data word.

16. A communication system comprising:

a communication network;

a data packet router, communicatively coupled to the communication network, for routing data words in data packets across the communication network, the data packet router comprising:

a first data register for storing a data word;

a second data register; and at least one carry save adder (CSA) device, electrically coupled to the first data register and to the second data register, for counting the number of bits set to one in the data word stored in the first data register and storing in the second data register a value representing the count of bits set to one in the data word; and a third data register for storing a data word;

an offset register for storing an offset value; and a one-cycle shifter, electrically coupled to the first data register, to the third data register, and to the offset register, for shifting the data word stored in the third data register by a value stored in the offset register and storing the shifted data word in the first data register, and for counting the number of bits set to one in the shifted data word stored in the first data register.

17. The communication system of claim 16, wherein the at least one CSA device counts the number of bits set to one in the data word stored in the first data register within a processor cycle.

18. The communication system of claim 16, wherein the at least one CSA device comprises a plurality of CSA devices organized in a tree structure to count the number of bits set to one in the data word stored in the first data register and to store in the second data register the value representing the count of bits set to one in the data word.

19. The communication system of claim 18, wherein the plurality of CSA devices organized in a tree structure count the number of bits set to one in the data word stored in the first data register within a processor cycle.

20. The communication system of claim 16, wherein the one-cycle shifter shifts right the data word stored in the third data register by the number of bits indicated by the value stored in the offset register and shifts in from the left side of the data word bits with value of zero by the number of bits indicated by the value stored in the offset register, the shifted data word being stored in the first data register.

* * * * *